US012433440B2

(12) United States Patent
Hsieh

(10) Patent No.: US 12,433,440 B2
(45) Date of Patent: Oct. 7, 2025

(54) CURTAIN CONTROL SYSTEM AND CURTAIN CONTROL METHOD

(71) Applicant: Chung Hsien Hsieh, New Taipei (TW)

(72) Inventor: Chung Hsien Hsieh, New Taipei (TW)

( * ) Notice: Subject to any disclaimer, the term of this patent is extended or adjusted under 35 U.S.C. 154(b) by 265 days.

(21) Appl. No.: 18/320,236

(22) Filed: May 19, 2023

(65) Prior Publication Data

US 2024/0188745 A1 Jun. 13, 2024

(30) Foreign Application Priority Data

Dec. 8, 2022 (TW) .................................. 111147132

(51) Int. Cl.
*A47H 5/032* (2006.01)
*E06B 9/68* (2006.01)
*A47H 5/02* (2006.01)

(52) U.S. Cl.
CPC ............. *A47H 5/0325* (2013.01); *E06B 9/68* (2013.01); *A47H 2005/025* (2013.01); *E06B 2009/6809* (2013.01)

(58) Field of Classification Search
CPC ...... E06B 2009/6836; E06B 9/88; E06B 9/80; E06B 9/68; E06B 2009/6809; E06B 2009/6872; E06B 2009/6845; E06B 2009/6818
See application file for complete search history.

(56) References Cited

U.S. PATENT DOCUMENTS 7,299,847 B1 * 11/2007 Evans ....................... E06B 9/74 160/1
9,610,464 B2 4/2017 Bigelow et al.
11,035,172 B2 * 6/2021 Rieper .................... E06B 9/322
2013/0228289 A1 * 9/2013 Klish ........................ E06B 9/82 160/405
2020/0123852 A1 * 4/2020 Selogy .................... E06B 9/322
2021/0189798 A1 6/2021 Nien et al.

FOREIGN PATENT DOCUMENTS

TW M314253 U 6/2007
TW M593223 U 4/2020

OTHER PUBLICATIONS

WSER50 Obstacle Detection information sheet (Year: 2021).*
TW Office Action dated Apr. 18, 2023 issued in Taiwan application No. 111147132.
Search Report issued in TW Office Action dated Apr. 18, 2023 issued in Taiwan application No. 111147132.

* cited by examiner

*Primary Examiner* — Abe Massad
(74) *Attorney, Agent, or Firm* — McClure, Qualey & Rodack, LLP

(57) ABSTRACT

The present invention relates to a curtain control system and a curtain control method. When a controller receives a curtain-releasing signal, a braking module releases a curtain so as to lower it, a current position detecting module detects an absolute position of the curtain, and the controller calculates a current velocity and a current acceleration of the curtain according to a variation per unit time of the absolute position. When the current velocity is equal to zero or the current acceleration is smaller than zero, the controller controls a motor to lift the curtain or controls the braking module to hold the curtain at a current position. Accordingly, the present invention uses the absolute position to calculate the current velocity and the current acceleration of the curtain so as to determine whether the curtain has encountered an obstacle.

6 Claims, 5 Drawing Sheets

CURTAIN CONTROL SYSTEM AND CURTAIN CONTROL METHOD

FIELD OF THE INVENTION

The present invention relates to a curtain control system and a curtain control method, suitable for controlling the operation of a lifting curtain, such as a fire and smoke curtain, a rolling door, a sunshade curtain, and a projection screen.

DESCRIPTION OF THE PRIOR ART

Vertical lifting curtain systems, especially rolling curtain systems, such as rolling doors, fire and smoke curtains, general electric sunshade curtains, projection screens, are rarely provided with obstacle detection means. In the case that the obstacle detection means is provided, the vertical lifting curtain systems are equipped with infrared sensors in a position where obstacles may appear. If an obstacle appears, descending of the curtain is deactivated. However, misjudgment may occur according to such a manner. For example, the infrared sensors may be unable to detect a hollowed-out object. If the curtain shakes unexpectedly during the descent of the curtain or if the infrared sensor is blocked by a tiny object such as dusts and insects, misjudgment may occur.

In the prior art such as U.S. Pat. No. 9,610,464, entitled "Deployable, Foldable Smoke/Fire Curtain Assembly", sensors are directly installed on the curtain. In U.S. Pat. No. 9,610,464, motion sensors, such as accelerometers, are provided on the base plate of the curtain, and the fact whether the curtain encounters an obstacle or not is determined by detecting the motion of the base plate.

However, this design is complicated and costly because the electric control unit for the fire/smoke curtain assembly is arranged on the top together with the motor, and it is necessary to arrange long wires for electrically connecting the motion sensors located on the base plate to the circuit board. These wires have to withstand frequent bending and high temperature for a long term. Moreover, according to such a manner, misjudgment may occur. For example, since the base plate shakes unexpectedly during the descent of the curtain, the system may determine that the curtain has encountered an obstacle even if the curtain did not actually encounter the obstacle.

SUMMARY OF THE INVENTION

The main object of the present invention is to provide a curtain control system and a curtain control method, which can accurately determine whether a curtain encounters a person or an obstacle in a descending process without installation of sensors for detecting the motion of the curtain and can make a proper reaction immediately.

To achieve the above object, the present invention provides a curtain control system, which mainly comprises a motor, a braking module, a current position detecting module, and a controller. The motor is adapted to drive a curtain up or down; the braking module is adapted to release or brake the curtain; the current position detecting module is adapted to detect an absolute position of the curtain; and the controller is electrically connected to the motor, the braking module, and the current position detecting module. When the controller receives a curtain-releasing signal, the controller controls the braking module to release the curtain and controls the current position detecting module to detect the absolute position of the curtain, and the controller calculates at least one of a current velocity and a current acceleration of the curtain according to a variation per unit time of the absolute position; when the current velocity is equal to zero or the current acceleration is less than zero, the controller controls the motor to lift the curtain or controls the braking module to brake the curtain at the current position.

In other words, when the curtain hits an obstacle during the descending process, the descending velocity of the curtain would be even reduced to zero. According to the system of the present invention, the absolute position of the curtain is detected by the current position detecting module, and accordingly, at least one of a current velocity and a current acceleration of the curtain can be calculated for determining the fact whether the curtain has encountered an obstacle or not. If the system determines that the curtain has encountered an obstacle, the system would immediately stop releasing the curtain or even lift the curtain immediately for safety reasons. Since the current position detecting module can be disposed adjacent to a motor controller and the reel of the curtain, it is unnecessary to arrange any wires and sensors on the curtain. Therefore, the present invention is safer, more stable, more reliable, and inexpensive.

To achieve the above object, the prevent invention provides a curtain control method, which mainly comprises the steps of: receiving a curtain-releasing signal by a controller; controlling a braking module to release a curtain by the controller; controlling a current position detecting module to detect an absolute position of the curtain by the controller; calculating at least one of a current velocity and a current acceleration of the curtain according to a variation per unit time of the absolute position by the controller; and controlling the braking module or a motor according to at least one of the current velocity and the current acceleration by the controller, wherein when the current velocity is equal to zero or the current acceleration is less than zero, the controller activates the braking module to hold the curtain at a current position or controls the motor to lift the curtain.

According to the curtain control method provided by the present invention, the absolute position of the curtain is detected by the current position detecting module, and accordingly, the current velocity and the current acceleration of the curtain can be calculated by the controller for determining the fact whether the curtain has encountered an obstacle or not during the descending process. When the current velocity is equal to zero or the current acceleration is less than zero, the curtain would be holed at a current position or lifted to an initial position for allowing personnel to escape.

DETAILED DESCRIPTION OF THE INVENTION

Figure 1:
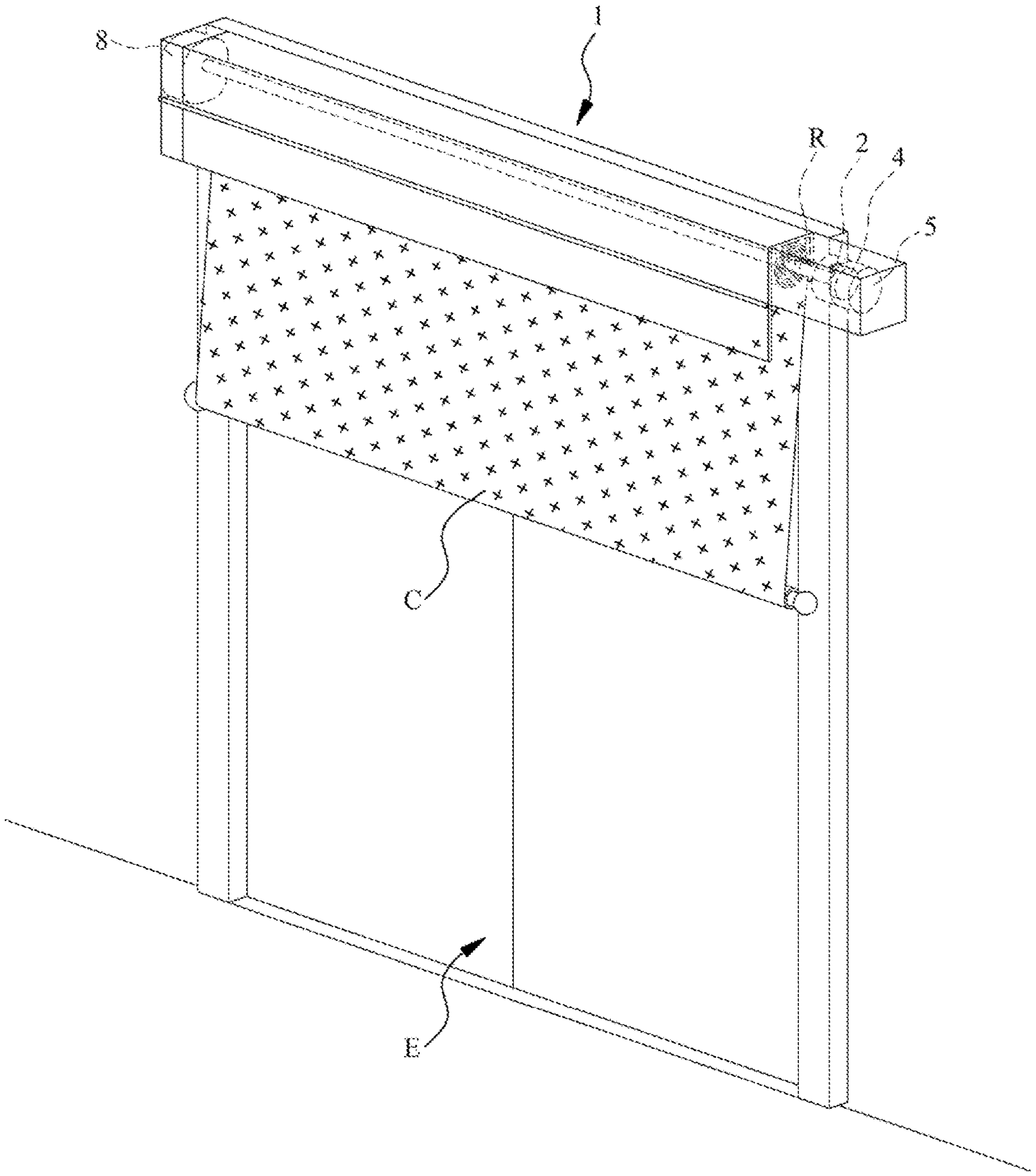
FIG. 1 is a schematic diagram of a curtain control system according to a preferred embodiment of the present invention.

Before a curtain control system and a curtain control method according to the present invention is described in detail in embodiments, it should be noted that in the following description, similar components will be designated by the same reference numerals. Furthermore, the drawings of the present invention are for illustrative purposes only, they are not necessarily drawn to scale, and not all details are necessarily shown in the drawings. A fire and smoke curtain will be described below as an example, but the present invention is not limited thereto, and other various lifting curtains or tarps can be applied to the present invention.

Figure 2:
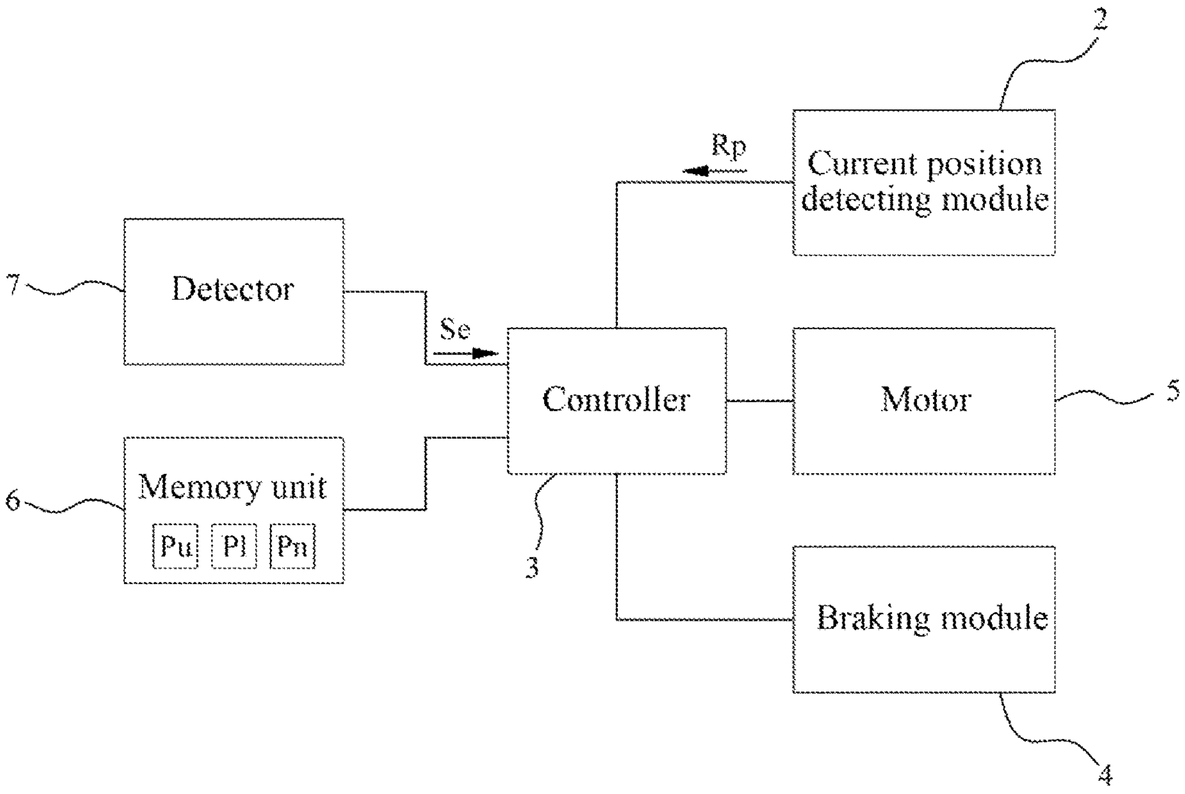
FIG. 2 is an architecture diagram of the curtain control system according to a preferred embodiment of the present invention.

Reference is made to FIG. 1 and FIG. 2. FIG. 1 is a schematic diagram of the curtain control system according to a preferred embodiment of the present invention, and FIG. 2 is an architecture diagram of the curtain control system according to a preferred embodiment of the present invention. The fire and smoke curtain system 1 of this embodiment is disposed at an elevator entrance E. In the case of a fire accidence or the presence of noxious gases, a curtain C would be automatically released to close the elevator entrance E in order to prevent smoke, noxious gases or contaminated air from spreading to other places through the elevator entrance E.

The fire and smoke curtain system 1 of this embodiment mainly includes a current position detecting module 2, a controller 3, a braking module 4, a motor 5, a memory unit 6, and a detector 7, wherein the motor 5 is capable of driving the curtain C up and down; the braking module 4 is capable of releasing or braking the curtain C; the current position detecting module 2 is adapted to detect the absolute position of the curtain C; the memory unit 6 can be any one of memory, such as a fixed or movable random access memory (RAM), a read-only memory (ROM), a flash memory, a hard disk, or the like or combination thereof; the detector 7 can be a high-temperature detector, a smoke detector, or other special gas detectors; the controller 3 can be a general microprocessor (MCU) or a control circuit including a microprocessor.

According to the present embodiment, the curtain is in form of a rolling curtain, that is, the curtain C is wound on a reel R. One end of the reel R is kinematically connected to the motor 5 and the braking module 4 and is driven by the motor 5 to wind the curtain C; the braking module 4 is adapted to release the reel R to allow the curtain C to descend under gravity or to brake the reel R so that the curtain C is held at a current position. It should be noted that, in this embodiment, the curtain C descends under gravity so that the descending velocity would gradually increase, but the present invention is not limited thereto. The reel R can be controlled by the braking module 4 or the motor 5 to allow the curtain C to descend at a constant velocity.

The current position detecting module 2 is coupled to the reel R and adapted to detect the number of revolutions and an angular position of the reel R in real time so as to obtain the absolute position of the curtain C. The details and operation of the current position detecting module 2 can be understood by referring to U.S. Pat. No. 9,562,385 which is also filed by the applicant of the present application. An upper limit position Pu, a lower limit position P1, and a reaction-stopping position Pn are stored in the memory unit 6 of the present embodiment. These positions can be set upon completion of installation of the system by executing a process comprising: releasing the curtain C by the brake module 4, detecting a start point and an end point of curtain C of a movement stroke by the current position detecting module 2, and recording the start point and the end point as the upper limit position Pu and the lower limit position P1 respectively. The reaction-stopping position Pn can be preset. For example, a position which is higher than the lower limit position P1 by 50 centimeters is set as the reaction-stopping position Pn.

After the installation of this system is completed, the curtain C can be moved over a movement stroke, and the start point and the end point of the stroke can be detected and recorded as the upper limit position Pu and the lower limit position P1 automatically. This is accurate and convenient. The reaction-stopping position Pn refers to a position below which the escape of personnel is infeasible, and therefore, it is unnecessary to make a feedback action in response to encountering an obstacle. The setting value of this position depends on the site conditions. In other implementations, the reaction-stopping position Pn may be unnecessary. It is possible that obstacle detection and timely feedback actions are required for the entire movement stroke.

Figure 3:
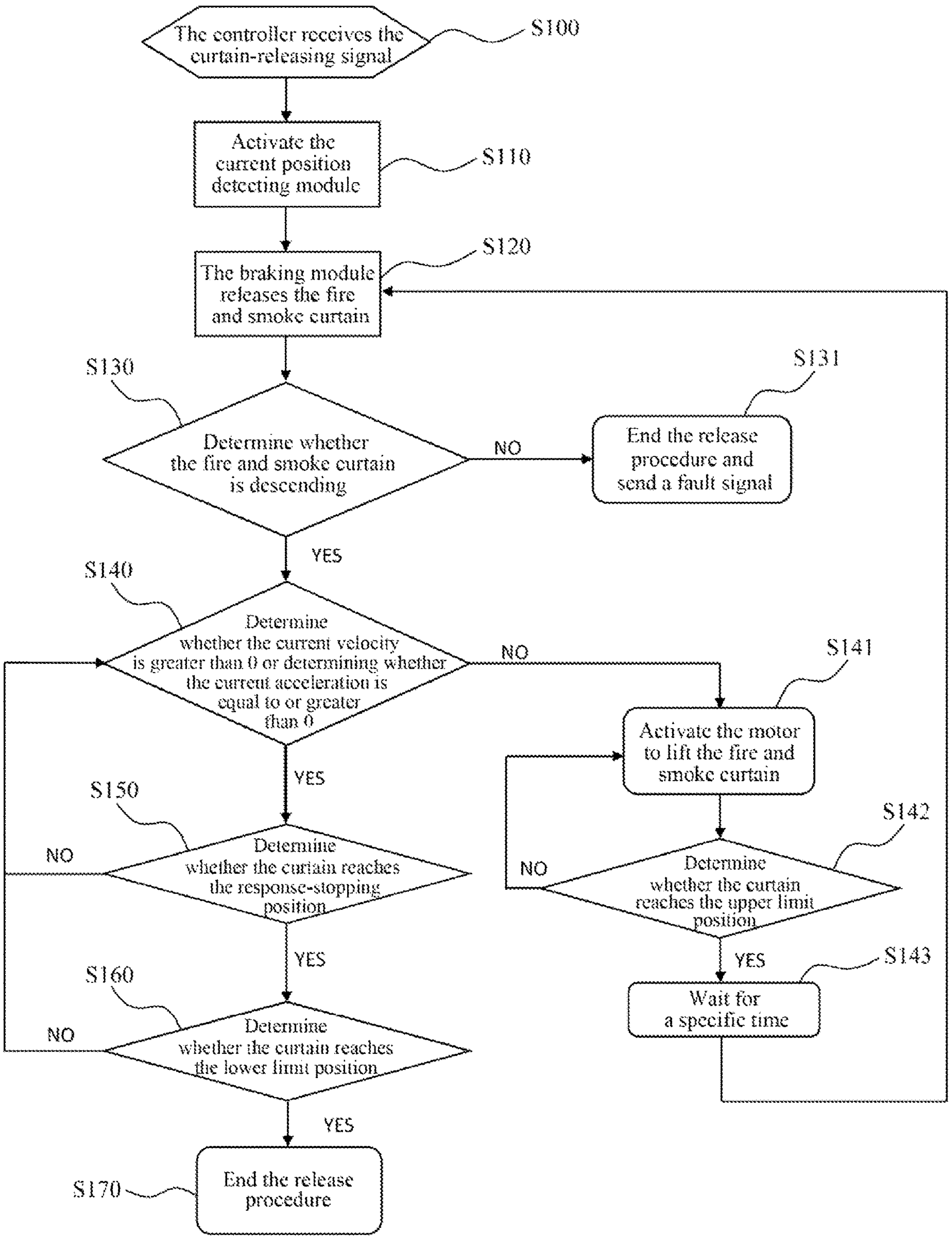
FIG. 3 is a flowchart of a process for controlling the curtain control system according to a preferred embodiment of the present invention.

The operating method of this embodiment will be described below. Reference is made to FIG. 3, which is a control flowchart of the curtain control system according to a preferred embodiment of the present invention. First, in the step S100 as shown in the figure, the controller 3 receives a curtain-releasing signal Se from the detector 7, that is, the detector 7 sends the curtain-releasing signal Se to the controller 3 if the detector 7 detects smoke. In other embodiments, the curtain-releasing signal Se can be issued from an external control system, such as a fire alarm system.

Next, in the step S110, the controller 3 activates the current position detecting module 2 to detect the absolute position Rp of the curtain C so as to determine whether the curtain C is positioned at the upper limit position Pu at this time. Even if the curtain C is not located at the upper limit position Pu, the current position of the curtain C can be used for subsequent control procedures.

Then, in the step S120, the controller 3 controls the braking module 4 to release the curtain C, allowing the curtain C to fall freely. At this time, the controller 3 simultaneously controls the current position detecting module 2 to continuously detect the absolute position Rp of the curtain C. The absolute position Rp of the curtain C can be used as a judgment basis for the following step. In the step S130, the controller 3 can determine whether the curtain C has fallen according to the absolute position Rp of the curtain C. If the curtain C has not fallen, the controller 3 stops the release procedure and sends a fault signal, such as a warning sound or a warning light, to remind the on-site personnel (i.e., the step S131).

If the controller 3 determines that the curtain C has begun to fall, the controller 3 calculates the current velocity and the current acceleration of the curtain C according to the variation per unit time of the absolute position Rp (i.e., the step S140). When the current velocity is greater than 0, the curtain C is descending. When the current acceleration is greater than 0, the curtain C is being accelerated during the descent process. When the current acceleration is equal to 0, the curtain C is descending at a uniform velocity. Accordingly, in the step S140, the fact whether the curtain C is being released normally is determined according to the aforementioned current velocity and current acceleration, wherein the uniform-velocity descent and the acceleration descent both are normal release states.

According to this embodiment, in the step S150, the controller 3 continuously monitors the current velocity and the current acceleration of the curtain C until the curtain C reaches the reaction-stopping position Pn. Before the curtain C reaches the reaction-stopping position Pn, if the current velocity and current acceleration have abnormal values, for example, the current velocity is 0, it means that the curtain C stops descending; for example, the current acceleration is smaller than 0, it means that the curtain C is decelerated during the descent process. At this time, the controller 3 determines that an obstacle has been encountered, and then activates the motor 5 to lift the curtain C (i.e. the step S141).

It should be noted that, in other embodiments of the present invention, the controller 3 can also activate the braking module 4 to brake the curtain C so as to hold the curtain C at the current position, that is, the braking module 4 brakes the curtain C to temporarily stop the curtain C from descending for a certain period of time so that the personnel can escape smoothly, and then the controller 3 controls the braking module 4 to release the curtain C again so as to allow it to continue descending.

In the step S142, while the motor 5 lifts the curtain C, the current position detecting module 2 still continues monitoring the absolute position Rp of the curtain C, and thereby, the controller 3 determines whether the curtain C has reached the upper limit position Pu. When the curtain C reaches the upper limit position Pu, the controller 3 deactivates the motor 5 and activates the braking module 4 to hold the curtain C at the upper limit position Pu for a specific time period, such as 30 seconds (i.e., the step S143). Next, the controller 3 controls the braking module 4 to release the curtain C again, that is, the operation returns to the step S120.

After the step S150, the controller 3 continues determining whether the curtain C has reached the lower limit position P1 according to the data issued by the current position detecting module 2 (i.e., the step S160). If the curtain C reaches the lower limit position P1 smoothly, the release procedure is ended (i.e., the step S170).

If the curtain C passes through the reaction-stopping position Pn and if the current velocity and the current acceleration have no abnormal values, the controller 3 no longer makes a reaction even if the curtain C encounters an obstacle. That is to say, between the reaction-stopping position Pn and the lower limit position P1, it is not necessary to make a feedback action due to encountering an obstacle since the escape of personnel is infeasible below the reaction-stopping position Pn. Preferably, in other embodiments of the present invention, an opening button (not shown in the figure) may be provided on the curtain C so that when the curtain C is completely closed and the personnel still need to escape, the curtain C can be opened by pressing the button.

In this embodiment, when an obstacle is encountered during a process of releasing the curtain C, and the obstacle is always located under the curtain C, that is, after the steps S120, S130, and S140 following the step S143 are repeatedly executed, for example, three times, the controller 3 no longer controls the curtain C to ascend, that is, the operation no longer proceeds to the step 141; the controller 3 activates the braking module 4 to brake the curtain C so that the curtain C is held at the current position to at least partially block smoke.

Figure 4:
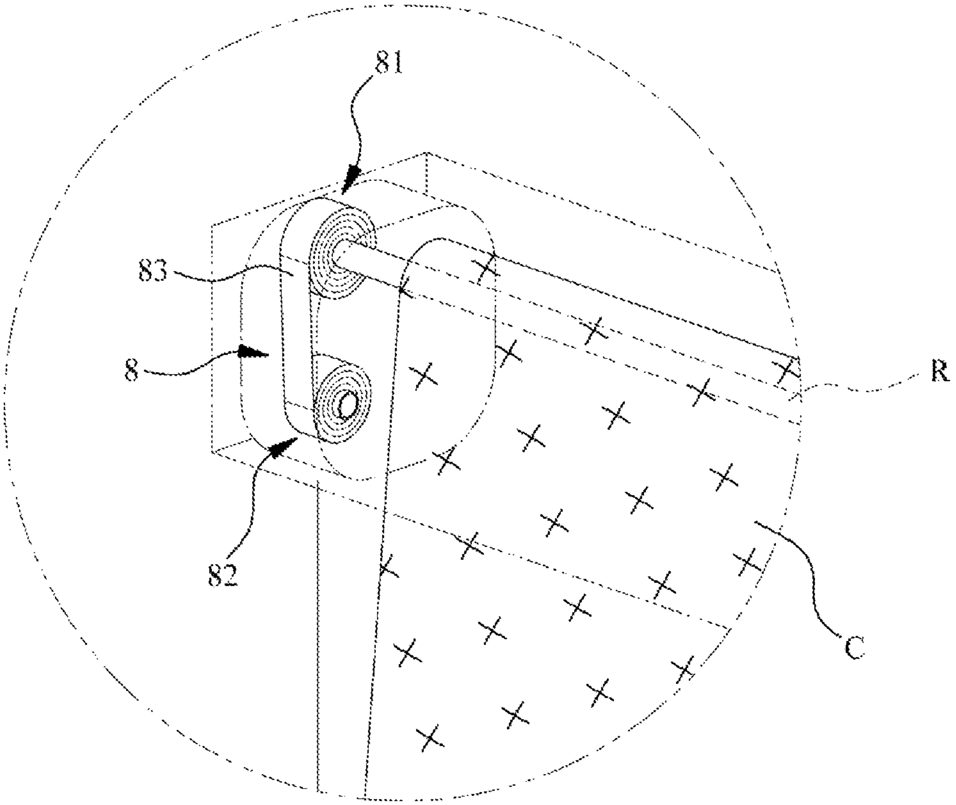
FIG. 4 is a partially enlarged perspective view of FIG. 1.

Reference is made to FIG. 4, which is a partially enlarged perspective view of FIG. 1 and mainly shows a torque-exerting module. As shown in the figure, the reel R in this embodiment is connected to the torque-exerting module 8, which can be a constant torque spring and can output a constant torque load in the direction of the reel R winding the curtain C. Specifically, the torque-exerting module 8 of this embodiment includes an output reel 81, a storage reel 82, and a steel strip 83. The reel R is connected to the output reel 81, and the two ends of the steel strip 83 are wound on the output reel 81 and the storage reel 82 respectively.

When the steel strip 83 is wound on the output reel 81 from the storage reel 82 by an external force, that is, when the reel R unwinds and lowers the curtain C, a constant torque having a tendency to wind the steel strip 83 on the output reel 81 is output through the output reel 81 for counteracting a part of the weight of the curtain C but does not affect the descent of the curtain C.

When an obstacle is encountered during the release of the curtain C, the rotational inertia of the reel R can be significantly reduced, and the curtain C can be stopped or decelerated faster since a part of the weight of the falling curtain C is counteracted with the torque-exerting module 8. As a result, the system can make a reaction quickly, the reaction time can be shortened, and the impact of the weight of the curtain C on the obstacle can be effectively reduced.

Figure 5:
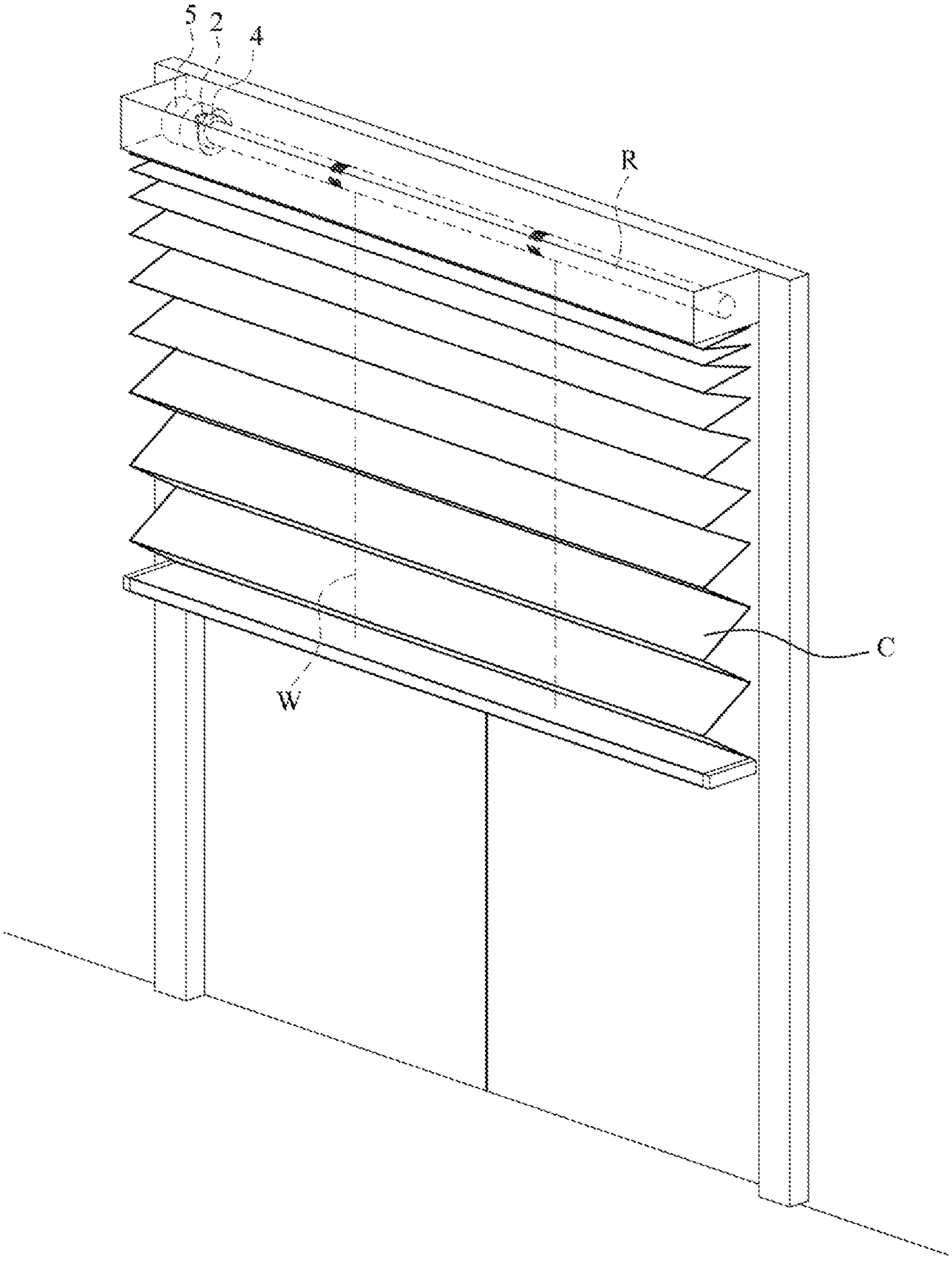
FIG. 5 is a schematic diagram of the curtain control system according to another preferred embodiment of the present invention.

Reference is made to FIG. 5, which is a schematic diagram of the curtain control system according to another preferred embodiment of the present invention. This embodiment aims to illustrate that the present invention is not limited to the aspect in which the reel R is used to directly wind the curtain C. Any aspect in which the reel R is used to directly or indirectly drive the curtain C up or down can be applied to the present invention. Specifically, the curtain C of this embodiment is a folding curtain, and the bottom end of the curtain C is connected with lift cords W, which are wound on the reel R. When the motor 5 drives the reel R to rotate, the reel R can lift or lower the curtain C through the lift cords W.

Ac can be seen from the above, the present invention is characterized in that during the release of the curtain C, the absolute position of the curtain C is detected by the current position detecting module 2, and the current velocity and the current acceleration can be calculated according to the absolute position and used to determine whether the curtain C encounters an obstacle. Consequently, it is unnecessary to install additional sensors on the curtain C or in the surrounding environment, thereby completely simplifying device components, electric wiring, and installation procedures, greatly reducing costs, and significantly improving reliability and service life.

The preferred embodiments of the present invention are illustrative only, and the claimed inventions are not limited to the details disclosed in the drawings and the specification. Accordingly, it is intended that it have the full scope permitted by the language of the following claims.

The invention claimed is:

1. A curtain control system, comprising:

a motor, adapted to drive a curtain up or down;

a braking module, adapted to release or brake the curtain;

a reel, which is coupled to the motor and the braking module and driven by the motor to wind the curtain up, the braking module being adapted to release the reel so as to lower the curtain or brake the reel so as to hold the curtain at the current position;

a torque-exerting module including an output reel, a storage reel, and a steel strip, wherein the reel is connected to the output reel, and the two ends of the steel strip are wound on the output reel and the storage reel respectively, and a constant torque applying a bias to wind the steel strip on the output reel is output through the output reel to counteract a part of a weight of the curtain when the reel unwinds the curtain down;

a current position detecting module, adapted to detect an absolute position of the curtain; and a controller, electrically connected to the motor, the braking module, and the current position detecting module, wherein when the controller receives a curtain-releasing signal, the controller controls the braking module to release the curtain and controls the current position detecting module to detect the absolute position of the curtain, and the controller calculates at least one of a current velocity and a current acceleration of the curtain according to a variation per unit time of the absolute position; when the current velocity is equal to zero or the current acceleration is smaller than zero, the controller controls the motor to lift the curtain or controls the braking module to brake the curtain at a current position.

2. The curtain control system of claim 1, wherein the current position detecting module is coupled to the reel and adapted to detect a number of revolutions and an angular position of the reel for obtaining the absolute position of the curtain.

3. The curtain control system of claim 1, further comprising a memory unit, in which an upper limit position, a lower limit position, and a reaction-stopping position are stored, wherein the controller deactivates the motor and activates the braking module to hold the curtain at the upper limit position when the controller controls the motor to drive the curtain up to the upper limit position; the controller controls the motor to lower the curtain independently from the current velocity and the current acceleration when the controller controls the braking module to release the curtain, and the curtain is located between the lower limit position and the reaction-stopping position.

4. A curtain control method, comprising the steps of:

(A) receiving a curtain-releasing signal by a controller;

(B) controlling a braking module to release a curtain by the controller; controlling a current position detecting module to detect an absolute position of the curtain by the controller; calculating at least one of a current velocity and a current acceleration of the curtain according to a variation per unit time of the absolute position by the controller; the controller controls the braking module to release a reel, on which the curtain is wound; the current position detecting module is coupled to the reel and adapted to detect a number of revolutions and an angular position of the reel so as to obtain the absolute position of the curtain; wherein the reel is connected to a torque-exerting module including an output reel, a storage reel, and a steel strip, wherein the reel is connected to the output reel, and the two ends of the steel strip are wound on the output reel and the storage reel respectively, and a constant torque applying a bias to wind the steel strip on the output reel is output through the output reel to counteract a part of a weight of the curtain when the reel unwinds the curtain down; and (C) controlling the braking module or a motor according to at least one of the current velocity and the current acceleration by the controller, when the current velocity is equal to zero or the current acceleration is smaller than zero, the controller controls the braking module to brake the curtain so that the curtain is held at a current position, or the controller controls the motor to drive the reel so as to lift the curtain, wherein when the current velocity is equal to zero or the current acceleration is smaller than zero, the controller activates the braking module to hold the curtain at a current position or controls the motor to lift the curtain.

5. The curtain control method of claim 4, wherein the controller includes a memory unit, in which an upper limit position, a lower limit position, and a reaction-stopping position are stored; in the step (C), when the curtain is located between the lower limit position and the reaction-stopping position, the controller controls at least one of the braking module and the motor independently from the current velocity and the current acceleration.

6. The curtain control method of claim 5, before the step (A), comprising a step (a1), in which the controller controls the braking module to release the curtain; the controller controls the current position detecting module to detect a start point and an end point of the curtain in a movement stroke and records the start point and the end point as the upper limit position and the lower limit position respectively; the controller sets a position at a specific distance from the lower limit position as the reaction-stopping position.

* * * * *